United States Patent
Lindoff et al.

(10) Patent No.: US 8,144,573 B2
(45) Date of Patent: *Mar. 27, 2012

(54) METHOD AND SYSTEM FOR USING THE SYNCHRONIZATION CHANNEL TO OBTAIN MEASUREMENTS IN A CELLULAR COMMUNICATIONS SYSTEM

(75) Inventors: Bengt Lindoff, Bjärred (SE); Anders Wallén, Eslöv (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 12/689,036

(22) Filed: Jan. 18, 2010

(65) Prior Publication Data

US 2010/0118693 A1 May 13, 2010

Related U.S. Application Data

(63) Continuation of application No. 11/566,508, filed on Dec. 4, 2006, now Pat. No. 7,675,846.

(60) Provisional application No. 60/805,653, filed on Jun. 23, 2006.

(51) Int. Cl.
*H04J 11/00* (2006.01)
(52) U.S. Cl. ........................................ 370/210
(58) Field of Classification Search .................. 370/203, 370/210, 331, 332; 375/259, 260; 455/39, 455/500, 507, 515, 436–444
See application file for complete search history.

(56) References Cited

U.S. PATENT DOCUMENTS

| | | | |
|---|---|---|---|
| 6,553,211 B1* | 4/2003 | Zhou | 455/126 |
| 2002/0019880 A1* | 2/2002 | Sakakura | 709/245 |
| 2002/0082013 A1* | 6/2002 | Lee et al. | 455/436 |
| 2003/0003906 A1* | 1/2003 | Demers et al. | 455/424 |
| 2005/0163238 A1* | 7/2005 | Fujii | 375/260 |
| 2006/0133321 A1* | 6/2006 | Lim et al. | 370/331 |
| 2006/0133527 A1* | 6/2006 | Yu et al. | 375/260 |
| 2006/0256839 A1* | 11/2006 | Tsai et al. | 375/131 |
| 2007/0058585 A1* | 3/2007 | Mudigonda et al. | 370/331 |
| 2007/0133484 A1* | 6/2007 | Albal et al. | 370/338 |
| 2007/0297324 A1 | 12/2007 | Lindoff et al. | |

* cited by examiner

*Primary Examiner* — Hassan Kizou
*Assistant Examiner* — Charles C Jiang
(74) *Attorney, Agent, or Firm* — Roger S. Burleigh

(57) ABSTRACT

A method and apparatus that utilizes the synchronization channel (SCH) by the user equipment (UE) to obtain time synchronization information and to perform cell search. In order to perform the SCH detection, only a correlation between the known SCH signal and the received sequence is needed, hence the FFT is not involved in the synchronization step. Typically the SCH and pilot symbols are transmitted with a constant power which is the same for all base stations. Hence, based on the serving cell (SC) SCH and pilot symbols, the power relation between these signals is estimated and the ratio applied when performing time synchronization to other cells (i.e. correlation the received sequence with the SCH from that particular NC) to estimate the pilot signal strength for the NB cell.

16 Claims, 3 Drawing Sheets

METHOD AND SYSTEM FOR USING THE SYNCHRONIZATION CHANNEL TO OBTAIN MEASUREMENTS IN A CELLULAR COMMUNICATIONS SYSTEM

CROSS-REFERENCE TO RELATED APPLICATIONS

This patent application is a continuation of U.S. patent application Ser. No. 11/566,508, filed on Dec. 4, 2006 now U.S. Pat. No. 7,675,846 and claims the benefit of U.S. Provisional Application No. 60/805,653, filed Jun. 23, 2006, the disclosure of which is incorporated herein by reference.

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND OF THE INVENTION

Background

The present invention relates to cellular communication networks. More particularly, and not by way of limitation, the present invention is directed to a system and method for making intra- and inter-frequency measurements by a user equipment (UE) in a cellular communication network.

In the evolution of mobile cellular communication standards such as Global System for Mobile Communication (GSM) and Wideband Code Division Multiple Access (WCDMA), new modulation techniques such as Orthogonal Frequency Division Multiplexing (OFDM) are anticipated to be implemented. In order to smoothly transfer the existing cellular communication systems to the new high capacity high data rate system in the existing radio spectrum, a new system able to operate on a flexible bandwidth (BW) is required. One such flexible cellular system is known as long term evolution of 3GPP (3G LTE), which can be viewed as an evolution of the 3G WCDMA standard. 3G LTE will likely use Orthogonal Frequency Division Multiplexing (OFDM) and will be able to operate on bandwidths spanning from 1.25 MHz to 20 MHz.

It is anticipated that a 3G LTE system will allow frequency reuse. In frequency reuse, all cells can use the same carrier frequency. Although WCDMA systems also allow for frequency reuse, in Multiple Access OFDM (OFDMA), the intra- and inter-frequency hand over (HO) measurements present challenges because a Fast Fourier Transform (FFT) is needed both for data detection and intra- and inter-frequency measurements. In WCDMA, a path searcher, which is required for obtaining the radio paths, could also be used for signal strength measurements, hence the RAKE detector could be used exclusively for data detection, while in OFDMA, the FFT is used for both tasks.

There foregoing challenges are handled differently by conventional methods. The first conventional method is to create gaps for intra- and inter-frequency measurements. When a User Equipment (UE) is close to a cell border, the UE requests an interruption in the reception in order to allocate the FFT to the neighboring (NB) cell. Disadvantageously, this results in a lower throughput due to the need to interrupt the data reception. The second conventional method requires synchronization of base stations. In this case, all cells have the same timing and when performing the FFT, all cells (serving cells (SC) and NB cells) pilot signals can be detected and signal strength estimated. Disadvantageously, this second method requires that the cells be synchronized. The third conventional method is to use two FFTs. One FFT is used for SC detection and one FFT is used for neighboring (NB) cell measurements. The disadvantage with this third conventional method is the need for two FFTs, resulting in an increased chip area cost in the UE. Hence there is a need for a method and apparatus for efficient handling of intra- and inter-frequency measurements in an OFDMA system.

SUMMARY

The present invention comprises a method and apparatus that utilizes the synchronization channel (SCH), which is a known time signal that is periodically transmitted with certain correlation properties. The SCH is used by the UE to obtain time synchronization information and to perform cell search. In order to perform the SCH detection, only a correlation between the known SCH signal and the received sequence is needed, hence the FFT is not involved in the synchronization step. Typically the pilot OFDM symbols, as well as the SCH, are transmitted with a constant power which is the same for all base stations. Hence, based on the SC SCH and pilot symbols, the power relation between these signals is estimated and the ratio applied when performing time synchronization to other cells (i.e. correlation the received sequence with the SCH from that particular NB cell) to estimate the pilot signal strength for the NB cell. According to the latest 3GPP Specification, SCH is transmitted every 5 milliseconds. Hence, using this technique, the FFT is not required for estimating the signal strengths for the NB cells, thereby overcoming the above cited disadvantages associated with the conventional methods. Another advantage of the present invention is that the base station transceiver (also known as node B) does not need to transmit all pilot signals in all resource blocks, which it may do even in almost empty cells, in order to perform HO measurements. Hence, the present invention is adapted to reduce pilot overhead allowing increased capacity in a cellular telecommunications system.

BRIEF DESCRIPTION OF THE SEVERAL VIEWS OF THE DRAWINGS

In the following section, the invention will be described with reference to exemplary embodiments illustrated in the figures, in which.

DETAILED DESCRIPTION

Figure 1:
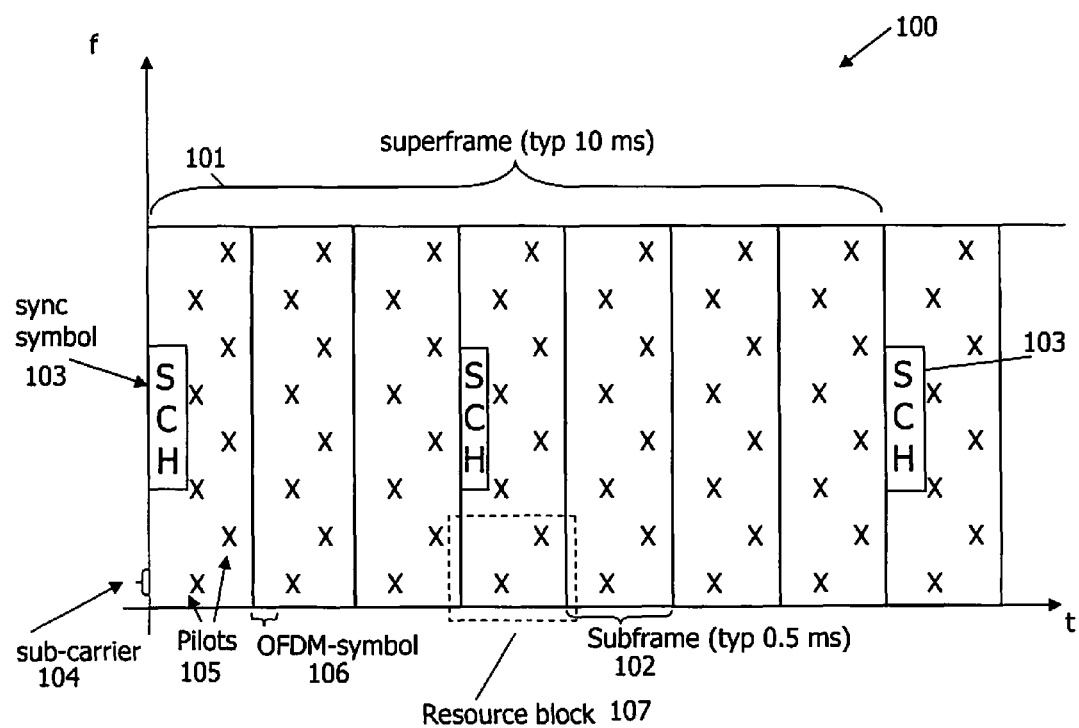
FIG. 1 is a time frequency structure for a DL OFDM system.

FIG. 1 provides a time frequency structure for a downlink (DL) portion of an OFDM system. A superframe 101, typically 10 ms in duration and having a certain bandwidth, consists of a number of subframes 102. As seen therein, the synchronization channel (SCH) 103 is transmitted at regular intervals, typically corresponding to one OFDM symbol per 5 ms. The SCH is used by a UE, such as a mobile terminal, cellular telephone and the like, to obtain time and frequency synchronization information from a cell and hence is used in the cell search procedure. An exemplary SCH consists of (a) two different signals, a primary signal being the same for all cells and used for time synchronization and a secondary signal that is different for different cells and is used for detecting the cell ID, or (b) one signal constructed in such a way that the timing can be found by autocorrelation of the signal while the cell ID is found by cross-correlation with known cell ID sequences. The present invention is applicable to either of the foregoing SCH constructions. For the UE to detect the cells, the SCH signals 103 are typically transmitted at high power equally from all cells. Also as noted in FIG. 1, some sub-carriers 104 in each OFDM symbol are known pilot signals. These pilot signals are used for estimating the radio channel in the frequency domain and used for equalizing the channel. In a cellular system, the pilot signals 105 are often also used as indicators of the signal strength, for example by summing the power of a well defined number of pilot signals. The signal strength is estimated for both of (1) the serving cell (SC), which is the cell that the UE is connected or camping on, and (2) the detected neighboring (NB) cells, which are the cells the UE has detected in the cell search. The estimated signal strength is used by the UE to find suitable HO candidates during mobility. In order to have sufficient signal strength measurements, the pilot signals 105 are transmitted with high and equal power.

The SCH power is defined as the magnitude of the correlation result summed over the length of the cyclic prefix around the correlation peak. Mathematically, this is written as:

$$P_{SCH} = \max_{k,j>0,k+j=\tau_{cp}} \sum_{i=i_0-j}^{i_0+k} D_i \qquad (1)$$

where $D_i$ is the squared magnitude of the correlation result at time i, $i_0$ is the time index giving the largest $D_i$ (correlation peak), $\tau_{cp}$ is the length of the cyclic prefix (in samples).

The pilot power is the sum of the squared magnitude of the channel estimates for well defined number of pilots in an OFDM symbol or resource block (group of OFDM symbols), i.e.

$$P_{pilot} = \sum_i P_i \qquad (2)$$

where $P_i = |h_i|^2$ and $h_i$ is the channel estimate for pilot i. Typically, the number of pilots included is the number of pilots 105 transmitted over the entire bandwidth in one OFDM symbol 106 or the sum over all pilots in one resource block 107, as seen in FIG. 1. One resource block is the smallest amount of data that can be allocated to one user. It is a block of 12 sub-carriers in frequency and 7 OFDM symbols, i.e., in 0.5 ms in time.

The ratio between the SCH power and the pilot power is a constant, i.e. $P_{pilot}/P_{SCH}=\gamma$. In one embodiment of the present invention, the ratio $P_{pilot}/P_{SCH}=\gamma$ can be obtained by the UE from a look-up table. If $\gamma$ is obtained from a look-up table, the values thereof can be based on operator requirements and/or the number of transmitted pilots, which in turn depends on known system parameters such as the current bandwidth and number of transmit antennas. In another embodiment of the present invention, $\gamma$ is estimated from the SC, while for NB cells, the pilot power is estimated according to:

$$P_{pilot,NB_i} = \hat{\gamma} P_{SCH,NB_i} \qquad (3)$$

Figure 2:
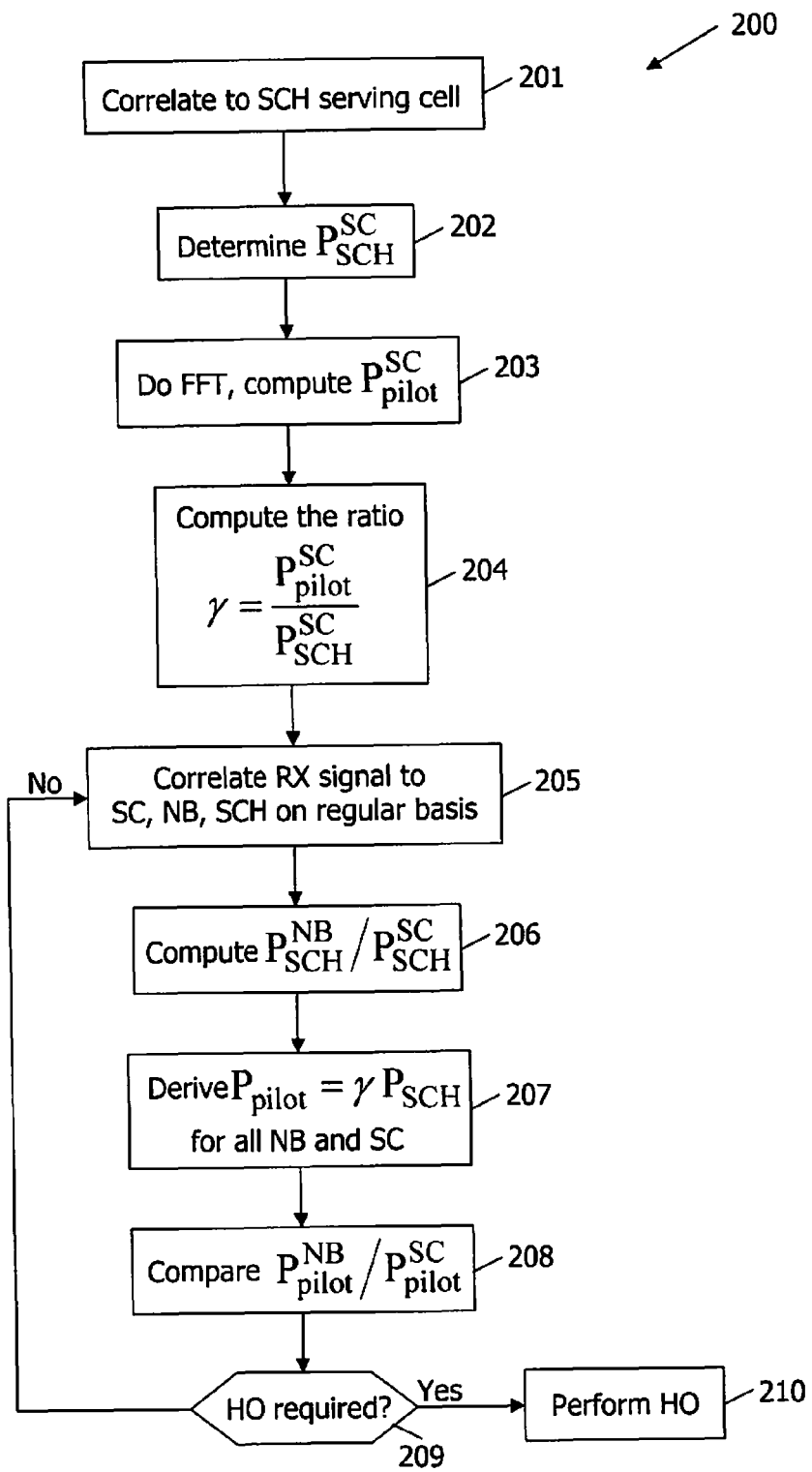
FIG. 2 is a flow chart of the method of the present invention.

A flow chart illustrating the steps 200 of the present invention is provided in FIG. 2. When these steps are performed, the UE is connected (active mode) or camping (idle mode) on SC. In step 201, the UE correlates the SCH for SC with the received signal to find the timing and power of the SC SCH in step 202. Next, in step 203, the UE performs an FFT of the received signal to obtain the pilot and data symbols and computes the signal strength based on the SC pilot symbols. In step 204, the ratio $\gamma$ is obtained either via look-up table or as computed by the UE. In step 205, and on a regular basis (typically 10-20 times/second), the UE correlates the received signal to the SC SCH and also to all NB cells SCH in the detected set. Then, in step 206, the power for SC and NB cells are computed. In step 207 the pilot power is computed according to equation (3) above. In step 208, the UE compares the pilot power for NB cells to the pilot power for the and, in step 209, detects whether a HO is needed. If so, the HO procedure begins in step 210, if not, the process returns to step 205.

Figure 3:
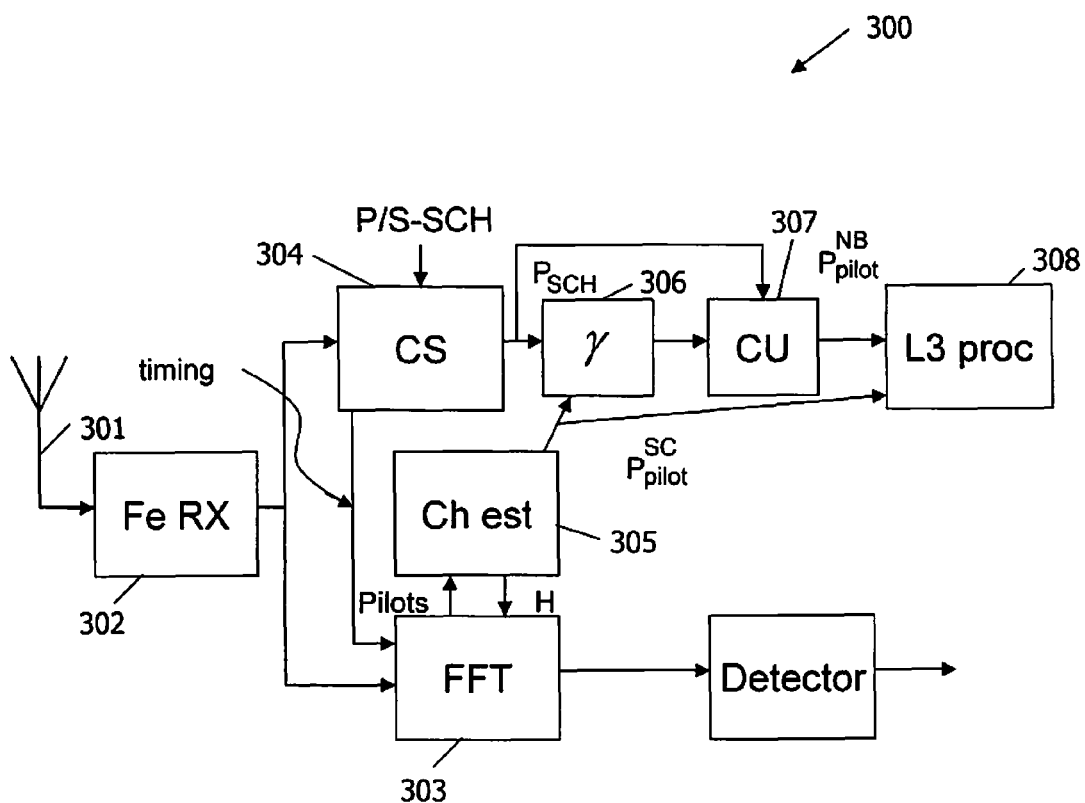
FIG. 3 is a block diagram of an apparatus adapted to implement the method of the present invention.

FIG. 3 is a block diagram 300 of an apparatus that is adapted to implement the novel method described above. As seen therein, the signal is received in the antenna 301 and down converted to a baseband signal in the front end receiver (Fe RX) 302. The signal is sent to both the Fast Fourier Transform (FFT) unit 303 and the cell search (CS) unit 304. The CS unit 304 finds new cells, by correlating the received signal to the SCH signal, as well as timing of SC and NB cells. The timing information is used by the FFT unit 303 to determine the samples on which to perform the FFT. The pilot is extracted and sent to the channel estimation (CH est) unit 305, estimating the channel (represented by a vector H). Also the SC pilot power is computed in the CH est unit 305 and fed together with the SCH power estimate of the SC to the $\gamma$ estimation unit 306. $\gamma$ is obtained (either via a look-up table or estimated) and applied to the SCH power estimate for NB cells in a control unit (CU) 307 and the pilot power for NB cells is computed. The pilot power is fed to the Layer 3 processing (L3 proc) unit 308 that compares the power for SC and NB cells and decides whether a HO is required.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method for performing measurements by a user equipment (UE) connected to a serving cell (SC) in an OFDMA system that is transmitting a known synchronization channel (SCH) at regular intervals and known pilot symbols on a fraction of sub-carriers, the method comprising:
   determining, by the UE, the synchronization position and SCH signal strength ($P_{SCH}$) for the SC at the UE by correlating a received signal with the known SCH;
   performing, by the UE, a Fast Fourier Transform (FFT) on the received signal to obtain the SCH signal strength in the frequency domain and using the known pilot symbols to estimate the pilot signal strength ($P_{pilot}$);
   determining, by the UE, the synchronization position and SCH signal strength on at least one neighboring (NB) cell by correlating the received signal with a known synchronization sequence for the NB cell; and determining, by the UE, the pilot signal strength for the at least one NB cell based on the SCH signal strength for the NB cell and a ratio $\gamma=P_{pilot}/P_{SCH}$.

2. A method of using a synchronization channel (SCH) in a mobile communications system, for performing measurements, comprising the steps of:
  connecting or camping a UE on a serving cell (SC) of a mobile telecommunications network;
  correlating, by the UE, the SCH of the SC with a received signal to obtain the timing and power of the SC SCH ($P_{SCH}$);
  performing, by the UE, a Fast Fourier Transform (FFT) of the received signal to obtain the pilot and data symbols;
  computing, by the UE, a signal strength of the pilot ($P_{pilot}$) based on the SC pilot symbols;
  obtaining a ratio $\gamma=P_{pilot}/P_{SCH}$;
  correlating, by the UE, on a regular basis, the received signal to the SCH of the SC and also to all neighboring (NB) cells SCH in the detected set;
  computing, by the UE, SCH power for SC and NB cells;
  computing, by the UE, pilot power according to: $P_{pilot \cdot NB_i} = \hat{\gamma} P_{SCH \cdot NB_i}$;
  comparing, by the UE, the pilot power for NB cells to the pilot power for the SC; and
  based on the comparison, determining if a hand over (HO) is needed.

3. The method of claim 2, for use in performing intra-frequency measurements.

4. The method of claim 2, for use in performing inter-frequency measurements.

5. The method of claim 2, wherein the ratio $\gamma=P_{pilot}/P_{SCH}$ is computed by the UE.

6. The method of claim 2, wherein the ratio $\gamma=P_{pilot}/P_{SCH}$ is obtained by the UE from a look-up table.

7. The method of claim 2, for use in a Third Generation Long Term Evolution (3G LTE) compliant system.

8. The method of claim 2, for use in a WiMax (IEEE 802.16) system.

9. The method of claim 2, as implemented in a UE selected from the group consisting of a mobile terminal, pager, smart-phone, mobile telephone and a computer.

10. An apparatus adapted to perform measurements when connected to a serving cell (SC) in an OFDMA system that is transmitting a known synchronization channel (SCH) at regular intervals and known pilot symbols on a fraction of sub-carriers, the apparatus comprising:
  an antenna;
  a front end receiver coupled to the antennas adapted to down convert a baseband signal;
  a Fast Fourier Transform (FFT) unit and cell search (CS) unit coupled to the front end receiver, the CS unit adapted to find new cells by correlating a received signal to the SCH, as well as timing of SC and neighboring (NB) cells;
  the FFT unit adapted to receive timing information to determine where to do the FFT;
  a channel (CH) estimation unit;
  the FFT unit to extract a pilot signal and sent it to the CH estimation unit;
  the CH estimation unit adapted to estimate the channel;
  the CH estimation unit further adapted to compute SC pilot power;
  a $\gamma$ estimation unit coupled to the CH estimation unit adapted to obtain the ratio $\gamma$;
  the CH estimation unit adapted to feed the SC pilot power and SCH power estimate of the SC to the $\gamma$ estimation unit;
  a control unit coupled to the $\gamma$ estimation unit;
  the $\gamma$ estimation unit adapted to obtain the ratio $\gamma$ and apply it to the SCH power estimate for NB cells in the control unit;
  a Layer 3 (L3) processing unit;
  the control unit adapted to compute pilot power for NB cells and feed the pilot power to the L3 processing unit; and,
  the L3 processing unit adapted to compare the power for SC and NB cells and determine whether a handover is required.

11. The apparatus of claim 10, wherein the apparatus is operable to perform intra-frequency measurements.

12. The apparatus of claim 10, wherein the apparatus is operable to perform inter-frequency measurements.

13. The apparatus of claim 10, wherein the ratio $\gamma$ is obtained by the $\gamma$ estimation unit from a look-up table.

14. The apparatus of claim 10, for use in a Third Generation Long Term Evolution (3G LTE) compliant system.

15. The apparatus of claim 10, for use in a WiMax (IEEE 802.16) system.

16. The apparatus of claim 10, as implemented in a UE selected from the group consisting of a mobile terminal, pager, smart-phone, mobile telephone and a computer.

* * * * *

UNITED STATES PATENT AND TRADEMARK OFFICE
CERTIFICATE OF CORRECTION

PATENT NO. : 8,144,573 B2  
APPLICATION NO. : 12/689036  
DATED : March 27, 2012  
INVENTOR(S) : Lindoff et al.

Page 1 of 1

It is certified that error appears in the above-identified patent and that said Letters Patent is hereby corrected as shown below:

In Column 4, Line 21, delete "and," and insert -- SC and, --, therefor.

Signed and Sealed this
Third Day of July, 2012

David J. Kappos
*Director of the United States Patent and Trademark Office*